United States Patent
Torii

(10) Patent No.: US 9,785,871 B2
(45) Date of Patent: Oct. 10, 2017

(54) PRINT CONTROL DEVICE AND NON-TRANSITORY COMPUTER READABLE MEDIUM

(75) Inventor: Takeshi Torii, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 825 days.

(21) Appl. No.: 13/485,065

(22) Filed: May 31, 2012

(65) Prior Publication Data

US 2013/0070271 A1    Mar. 21, 2013

(30) Foreign Application Priority Data

Sep. 20, 2011   (JP) .................................. 2011-204280

(51) Int. Cl.
*G06K 15/02*    (2006.01)
*G06F 3/12*    (2006.01)

(52) U.S. Cl.
CPC ......... *G06K 15/1809* (2013.01); *G06F 3/124* (2013.01); *G06F 3/1211* (2013.01); *G06F 3/1285* (2013.01); *G06K 15/1856* (2013.01); *G06K 15/1857* (2013.01); *G06K 2215/0088* (2013.01)

(58) Field of Classification Search
CPC .... G06F 3/1211; G06F 3/1285; G06F 3/1856; G06F 3/1857; G06F 3/1809
See application file for complete search history.

(56) References Cited

U.S. PATENT DOCUMENTS 6,067,097 A * 5/2000 Morita ...................... G06T 1/20
                                                        345/505
7,019,854 B1 * 3/2006 Sawano ................ G06F 3/1204
                                                        358/1.15
(Continued)

FOREIGN PATENT DOCUMENTS

JP     09-233284 A    9/1997
JP     10-154050 A    6/1998
(Continued)

OTHER PUBLICATIONS

Office Action issued by Australian Patent Office in corresponding Australian Patent Application No. 2012203635, dated Jan. 16, 2014.

*Primary Examiner* — John Wallace
*Assistant Examiner* — Darryl V Dottin
(74) *Attorney, Agent, or Firm* — Sughrue Mion, PLLC

(57) ABSTRACT

A print control device includes drawing processing units, a sending unit, and a delivery unit. The drawing processing units perform a drawing process on a print instruction written in a page description language. The sending unit sends the entirety of a print instruction constituted by plural pages, to the drawing processing units. The delivery unit sequentially delivers processing requests each specifying a page to the drawing processing units. Each drawing processing unit performs a drawing process by converting the print instruction for a page specified by a delivered processing request into image data, and again performs, when processing requests are delivered in descending order of page, processing of the sent print instruction from the first (Continued)

page. The delivery unit delivers a processing request to a drawing processing unit to which processing requests are deliverable in ascending order of page.

19 Claims, 14 Drawing Sheets

(56) References Cited

U.S. PATENT DOCUMENTS

| | | | |
|---|---|---|---|
| 7,380,121 B2* | 5/2008 | Nomura et al. ............. 713/166 |
| 9,069,508 B2* | 6/2015 | Kawaura | |
| 2002/0186409 A1* | 12/2002 | Laverty et al. ............. 358/1.15 |
| 2003/0202209 A1* | 10/2003 | Mellor ............... G06K 15/1856 |
| | | | 358/1.16 |
| 2005/0243363 A1* | 11/2005 | Muto ........................... 358/1.15 |
| 2007/0070403 A1* | 3/2007 | Toda et al. ................... 358/1.15 |
| 2008/0270402 A1* | 10/2008 | Inoue ................... G06F 3/1212 |
| 2009/0153892 A1 | 6/2009 | Torii | |
| 2011/0141507 A1* | 6/2011 | Kawaura ................. G06F 3/121 |
| | | | 358/1.13 |
| 2011/0157637 A1* | 6/2011 | Kimura ............. G06K 15/1849 |
| | | | 358/1.15 |
| 2012/0026520 A1 | 2/2012 | Torii | |
| 2012/0062939 A1* | 3/2012 | Miyazaki ..................... 358/1.15 |

FOREIGN PATENT DOCUMENTS

| | | |
|---|---|---|
| JP | 2000078392 A | 3/2000 |
| JP | 2002-073303 A | 3/2002 |
| JP | 2006-039719 A | 2/2006 |
| JP | 2008-015605 A | 1/2008 |
| JP | 2009-146251 A | 7/2009 |
| JP | 2009-172913 A | 8/2009 |
| JP | 2010049345 A | 3/2010 |
| JP | 2010-282336 A | 12/2010 |
| JP | 2011-051234 A | 3/2011 |
| JP | 2011-053944 A | 3/2011 |
| JP | 2011-096280 A | 5/2011 |

* cited by examiner

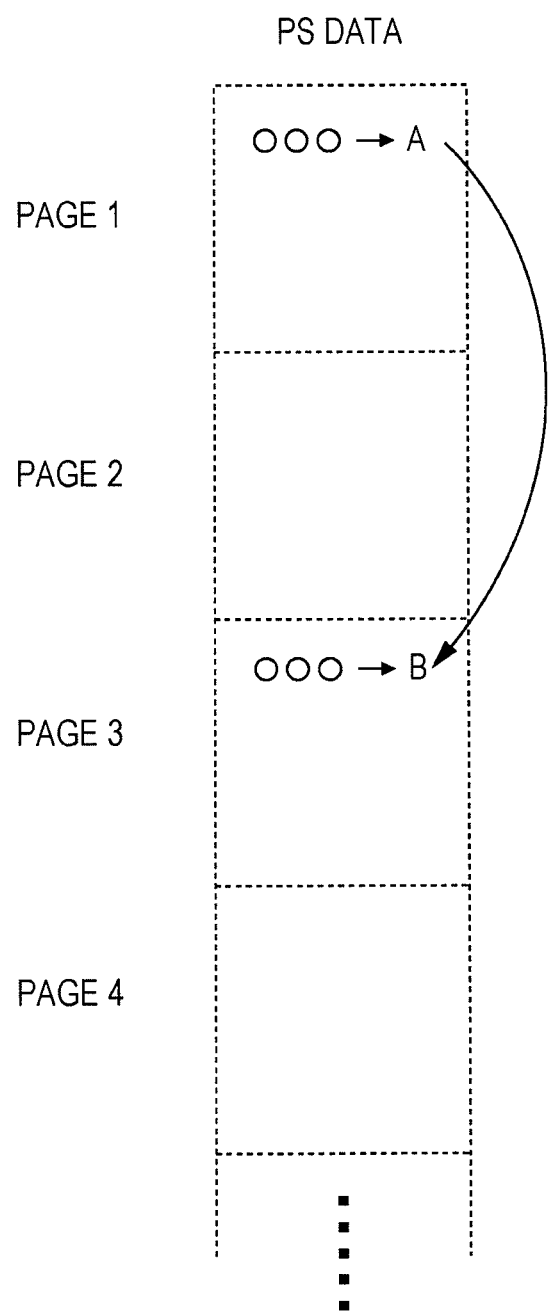

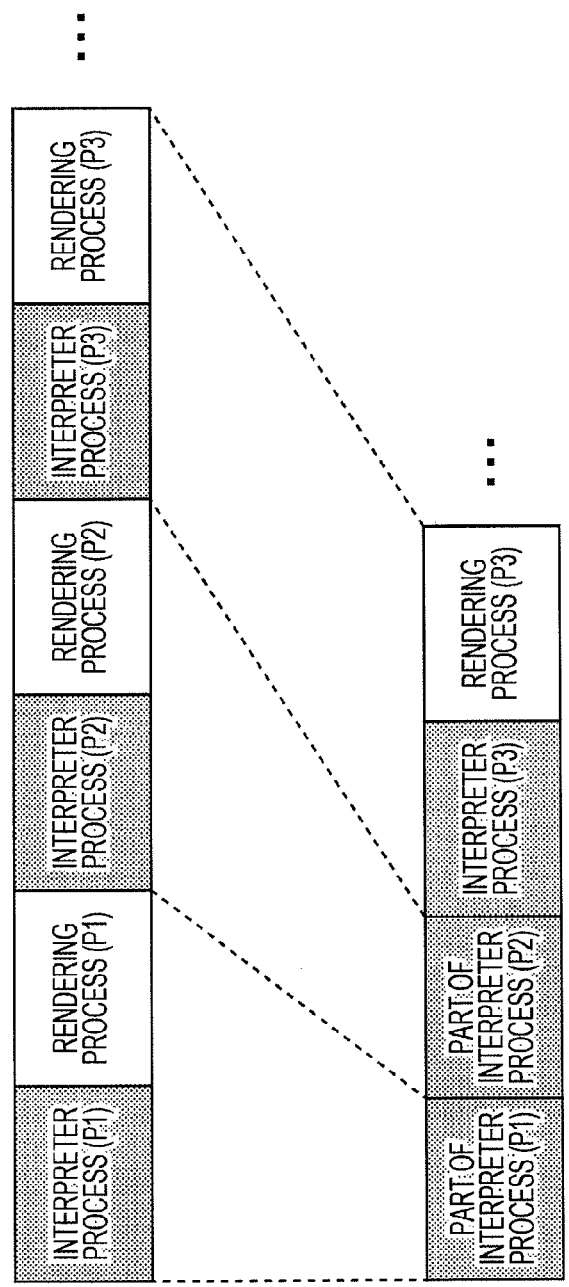

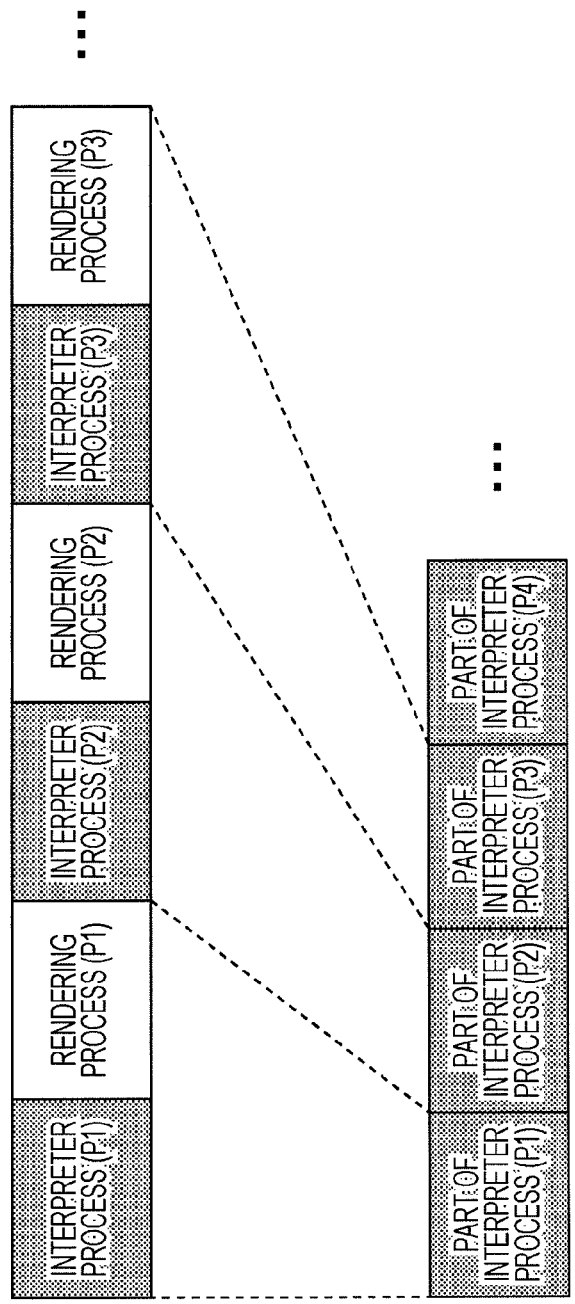

4-1 IMPOSITION

16-PAGE SADDLE STITCHING

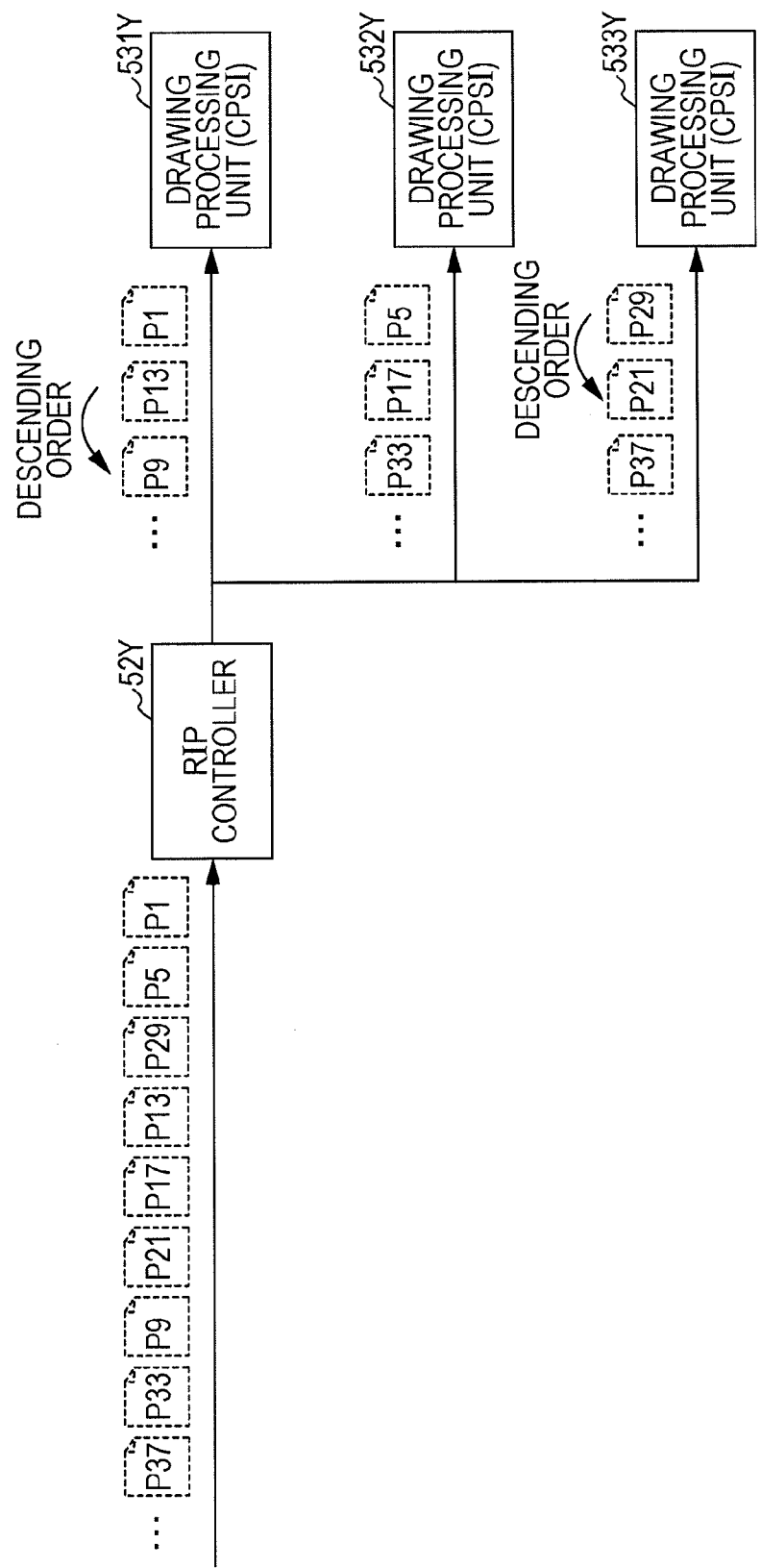

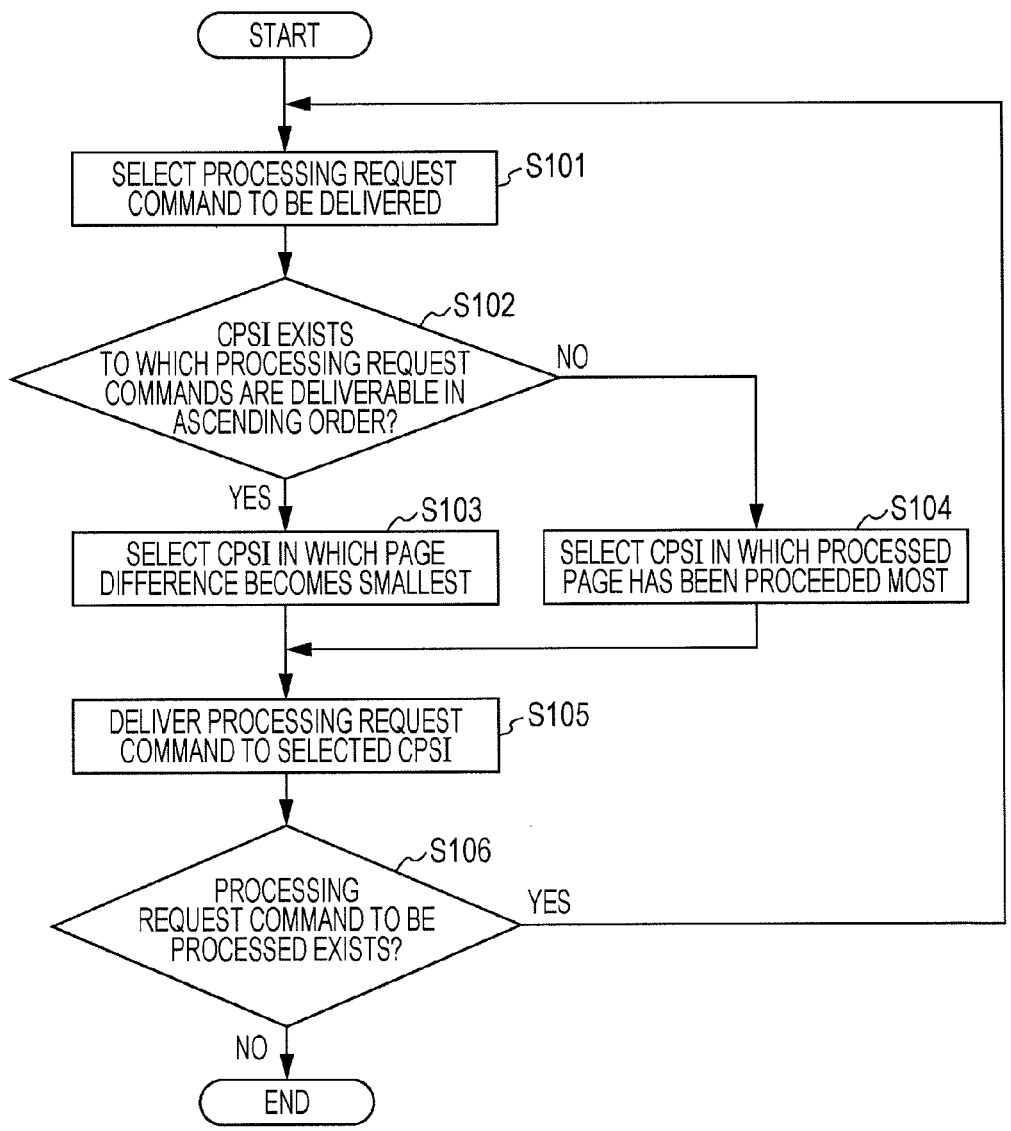

PRINT CONTROL DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-204280 filed Sep. 20, 2011.

BACKGROUND (i) Technical Field

The present invention relates to print control devices and non-transitory computer readable media.

SUMMARY

According to an aspect of the invention, there is provided a print control device including multiple drawing processing units, a sending unit, and a delivery unit. The multiple drawing processing units perform a drawing process on a print instruction written in a page description language. The sending unit sends the entirety of a print instruction constituted by multiple pages, to the multiple drawing processing units. The delivery unit sequentially delivers processing requests to the multiple drawing processing units, the processing requests each specifying which page in the print instruction is to be subjected to a drawing process. Each of the multiple drawing processing units performs a drawing process by converting the print instruction for a page specified by a processing request delivered by the delivery unit into image data, and again performs, when processing requests are delivered in descending order of page such that a page specified by a current processing request is a page preceding a page specified by a last processing request, processing of the sent print instruction from the first page. The delivery unit delivers a processing request to a drawing processing unit to which processing requests are deliverable in ascending order of page such that a page specified by the processing request that is to be delivered next time is a page following a page specified by a processing request that was delivered last time.

BRIEF DESCRIPTION OF THE DRAWINGS

An exemplary embodiment of the present invention will be described in detail based on the following figures, wherein:

FIG. 5 describes a structure of PostScript (PS) data;

FIGS. 6A and 6B describe a page skip function of a configurable PostScript interpreter (CPSI);

FIGS. 7A and 7B describe a page count mode of the CPSI;

FIG. 9 illustrates a state in which processing request commands are mechanically delivered to drawing processing units having no processing request command to be processed, when a print job is executed in which pages are arranged inconsecutively;

FIG. 10 is a flowchart illustrating a processing flow of an operation of a RIP controller.

DETAILED DESCRIPTION

An exemplary embodiment of the present invention will now be described in detail with reference to the accompanying drawings. In the exemplary embodiment of the present invention, "the page" also means "the page number".

Figure 1:
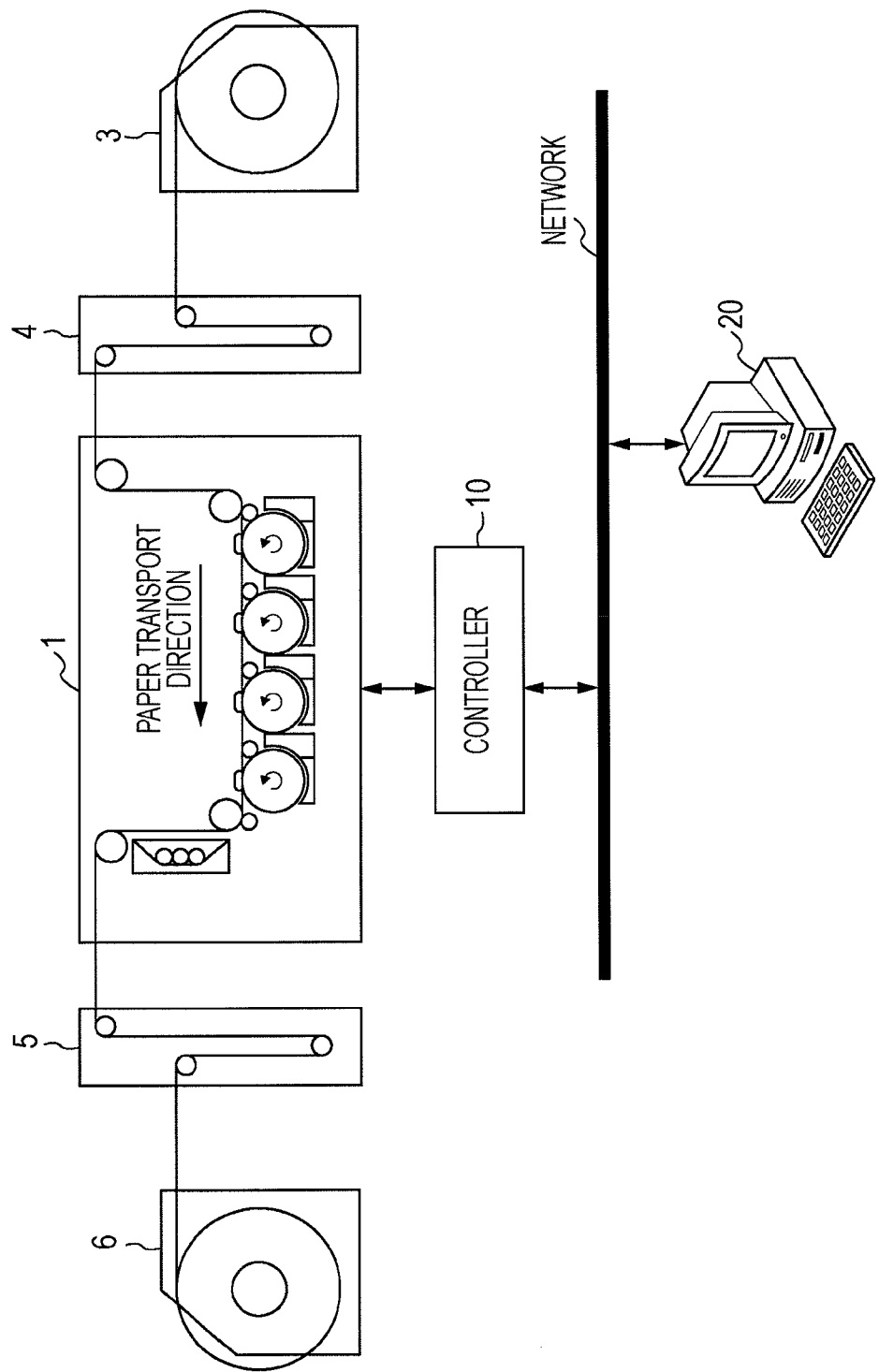
FIG. 1 illustrates a system configuration of a printing system according to an exemplary embodiment of the present invention.

FIG. 1 illustrates an example of a configuration of a printing system (corresponding to an image forming system) according to an exemplary embodiment of the present invention. As illustrated in FIG. 1, this printing system includes a pre-processing apparatus 3, a buffering apparatus 4, a printing apparatus 1 (corresponding to an image output apparatus) which performs printing on a continuous sheet, a buffering apparatus 5, a post-processing apparatus 6, a controller (corresponding to a print control device) 10, and a terminal apparatus 20.

The pre-processing apparatus 3 performs pre-processing, such as feeding a print sheet on which printing is to be performed. The post-processing apparatus 6 performs post-processing, such as rolling the print sheet on which printing has been performed. The buffering apparatuses 4 and 5 are provided to keep the print sheet tense between the pre-processing apparatus 3 and the printing apparatus 1 and between the printing apparatus 1 and the post-processing apparatus 6, respectively, and so forth.

The terminal apparatus 20 generates a print instruction, such as a print job, and sends the generated print instruction to the controller 10 via a network. The controller 10 functions as a print control device that controls a printing operation of the printing apparatus 1 in accordance with the print instruction sent from the terminal apparatus 20. Under control of the controller 10, the printing apparatus 1 outputs an image based on the print instruction on the continuous sheet.

Figure 2:
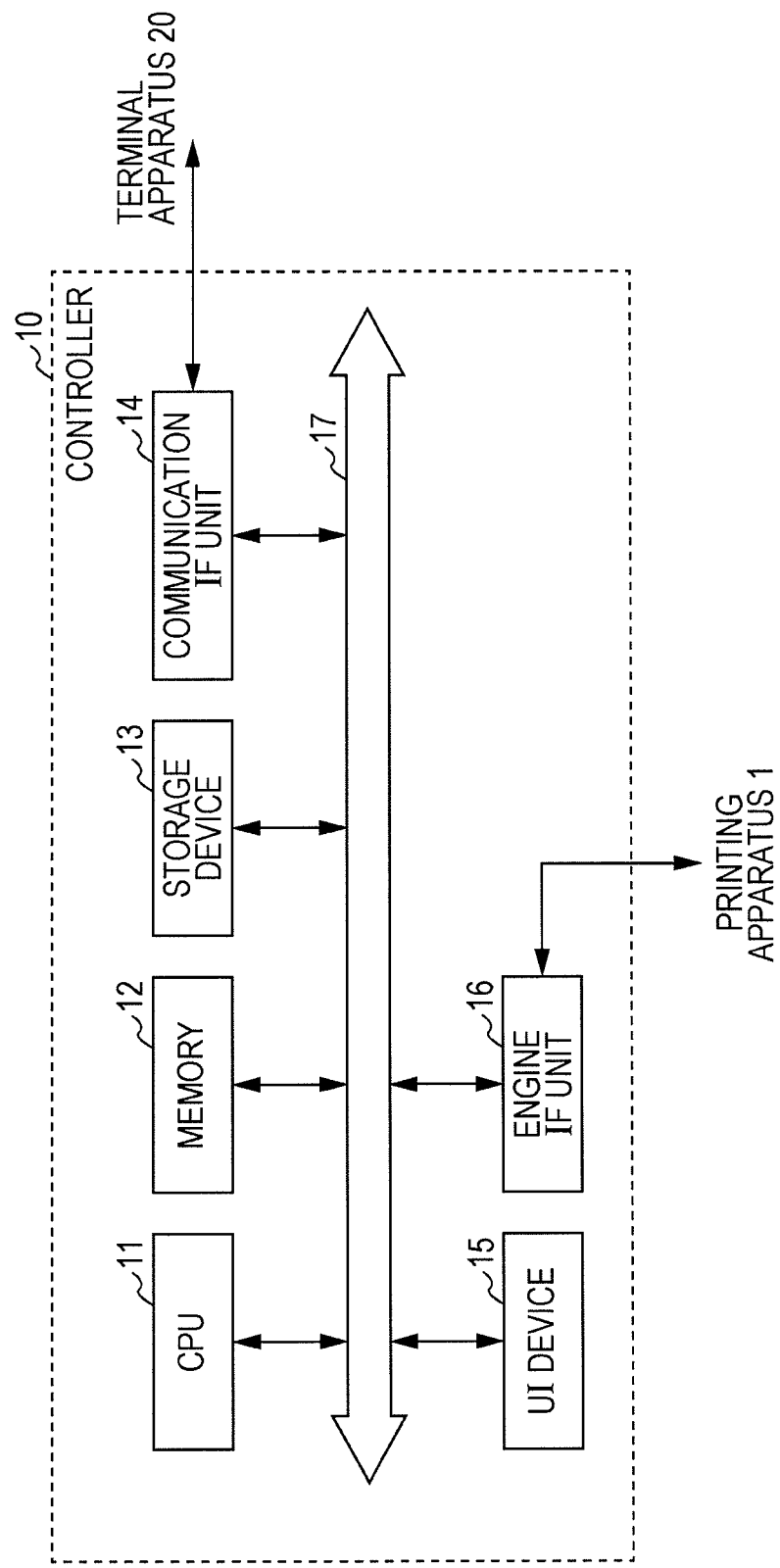
FIG. 2 is a block diagram illustrating a hardware configuration of a controller included in the printing system according to the exemplary embodiment of the present invention.

A hardware configuration of the controller 10 included in the printing system according to the exemplary embodiment will now be described with reference to FIG. 2. As illustrated in FIG. 2, the controller 10 according to the exemplary embodiment includes: a central processing unit (CPU) 11; a memory 12; a storage device 13 such as a hard disk drive (HDD); a communication interface (IF) unit 14 that exchanges data with the terminal apparatus 20 via the network; a user interface (UI) device 15 including a touch panel and a liquid crystal display; and an engine IF unit 16 that exchanges data with the printing apparatus 1. These components are interconnected via a control bus 17.

The CPU 11 executes predetermined processes on the basis of a control program for printing stored in the memory 12 or the storage device 13, thereby controlling operations of the controller 10.

Although it has been described that the CPU 11 reads out and executes the control program stored in the memory 12 or the storage device 13 in this exemplary embodiment, the control program may be provided to the CPU 11 after being stored on a portable storage medium, such as a compact disc-read only memory (CD-ROM).

Figure 3:
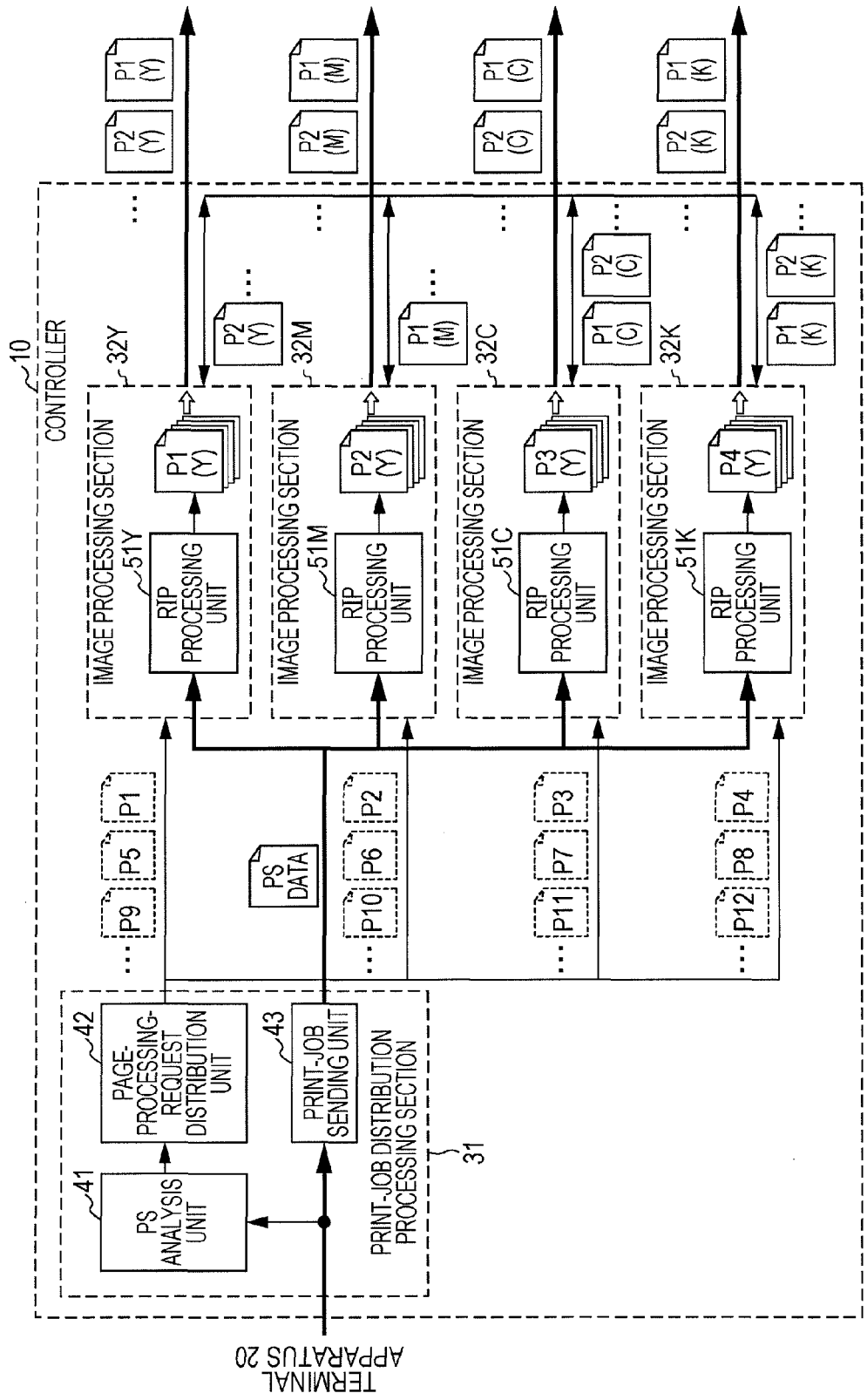
FIG. 3 is a block diagram illustrating a functional configuration of the controller included in the printing system according to the exemplary embodiment of the present invention.

FIG. 3 is a block diagram illustrating a functional configuration of the controller 10, which is realized as a result of execution of the control program.

As illustrated in FIG. 3, the controller 10 according to the exemplary embodiment includes a print-job distribution processing section 31 and four image processing sections 32Y, 32M, 32C, and 32K provided for corresponding primary colors.

Here, the corresponding primary colors indicate colors assigned to the corresponding multiple image processing sections provided for corresponding printing primary colors. For example, when four colors, i.e., yellow, magenta, cyan, and black, are used as the printing primary colors, the corresponding primary colors indicate these colors that are assigned to the corresponding image processing sections provided for these colors.

The print-job distribution processing section 31 has a function of analyzing commands of a print job (corresponding to a print instruction) sent from the terminal apparatus 20. Specifically, the print-job distribution processing section 31 includes a PostScript (PS) analysis unit 41, a page-processing-request distribution unit 42, and a print-job sending unit 43.

Meanwhile, page description languages (PDLs) are often used to write print jobs sent from the terminal apparatus 20.

Among PDLs, there are non-page-independent PDLs in which a change that is made on a print resource on a certain page is also applied to other pages, and page-independent PDLs in which information for use in a drawing process of a certain page is collectively written on a page-by-page basis. That is, a print job represented in a page-independent PDL is dividable into pages relatively easily. In contrast, it is difficult to divide a print job represented in a non-page-independent PDL into pages.

For example, a portable document format (PDF) is a page-independent PDL, whereas PostScript (registered trademark) is a non-page-independent PDL.

In the exemplary embodiment, the description will be given by using a print job represented in PostScript as an example of a non-page-independent print job. However, the exemplary embodiment of the present invention is similarly applicable as long as a print job is represented in a non-page-independent PDL.

Before a printing process is started, the print-job sending unit 43 sends the entire print job sent from the terminal apparatus 20 and constituted by multiple pages, to the four image processing sections 32Y, 32M, 32C, and 32K.

Upon receipt of PostScript (PS) data serving as the non-page-independent print job from the terminal apparatus 20, the PS analysis unit 41 analyzes commands of the print job to determine attributes, such as the number of pages.

With reference to an analysis result obtained by the PS analysis unit 41, the page-processing-request distribution unit 42 sequentially sends processing request commands to the four image processing sections 32Y, 32M, 32C, and 32K. Each processing request command specifies which page in the print job is to be subjected to image processing. Here, the page-processing-request distribution unit 42 sequentially distributes processing request commands to the corresponding image processing sections 32Y, 32M, 32C, and 32K in an order that pages are arranged in the print job.

The image processing sections 32Y, 32M, 32C, and 32K include raster image processing (RIP) processing units 51Y, 51M, 51C, and 51K, respectively. Each of the RIP processing units 51Y, 51M, 51C, and 51K converts image data of the page specified by the processing request command sent from the page-processing-request sending unit 42, into pieces of print data for the primary colors.

Each of the image processing sections 32Y, 32M, 32C, and 32K has: a transfer function of transferring to the other image processing sections, pieces of print data for the primary colors other than the color assigned thereto, among the pieces of print data for the primary colors generated by the corresponding RIP processing unit 51Y, 51M, 51C, or 51K; and an output function of outputting the piece of print data for the assigned color generated by the corresponding RIP processing unit 51Y, 51M, 51C, or 51K and transferred from the other image processing sections.

The controller 10 also includes print control sections (not illustrated in FIG. 3) that control printing mechanism sections provided for the corresponding colors in the printing apparatus 1 to output an image on a print sheet, on the basis of the pieces of print data generated by the image processing sections 32Y, 32M, 32C, and 32K.

In the example illustrated in FIG. 3, processing request commands that specify drawing processes of the image data of page 1 (P1), page 5 (P5), page 9 (P9), . . . are sent to the image processing section 32Y.

Similarly, processing request commands that specify drawing processes of the image data of page 2 (P2), page 6 (P6), page 10 (P10), . . . are sent to the image processing section 32M. Processing request commands that specify drawing processes of the image data of page 3 (P3), page 7 (P7), page 11 (P11), . . . are sent to the image processing section 32C. Processing request commands that specify drawing processes of the image data of page 4 (P4), page 8 (P8), page 12 (P12), . . . are sent to the image processing section 32K.

The image processing section 32Y first performs a rasterizing process in which the RIP processing unit 51Y converts image data of page 1, among the entire PostScript data sent from the print-job sending unit 43, into pieces of print data for the primary colors. Further, the image processing section 32Y transfers, among the pieces of print data resulting from the rasterizing process, magenta print data P1(M) to the image processing section 32M, cyan print data P1(C) to the image processing section 32C, and black print data P1(K) to the image processing section 32K.

Similarly, the image processing section 32M performs a rasterizing process in which the RIP processing unit 51M converts image data of page 2, among the entire PostScript data sent from the print-job sending unit 43, into pieces of print data for the primary colors. Further, the image processing section 32M transfers, among the pieces of print data resulting from the rasterizing process, yellow print data P2(Y) to the image processing section 32Y, cyan print data P2(C) to the image processing section 32C, and black print data P2(K) to the image processing section 32K.

In this manner, the image processing sections 32Y, 32M, 32C, and 32K sequentially perform rasterizing processes on individual pages, and transfer the resulting image data of other primary colors to the image processing sections responsible for the corresponding primary colors. The print control sections (not illustrated) provided for the corresponding primary colors control the printing mechanism sections provided for the primary colors in the printing apparatus 1 on the basis of the generated pieces of print data for the primary colors, thereby outputting an image on a print sheet.

Now, configurations of the RIP processing units 51Y, 51M, 51C, and 51K will be described. Although the configuration of the RIP processing unit 51Y will be described with reference to FIG. 4 here, the RIP processing units 51M, 51C, and 51K also have the same configuration.

Figure 4:
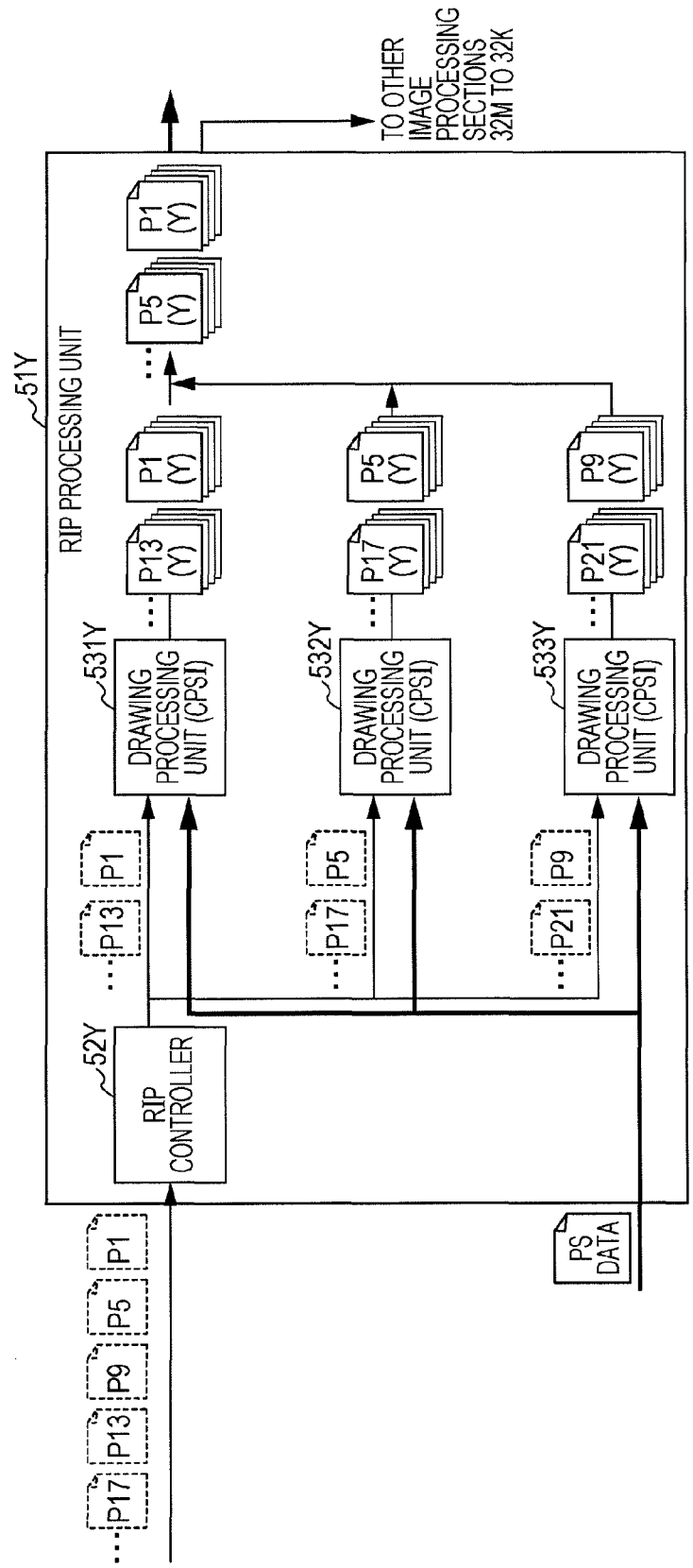
FIG. 4 is a block diagram illustrating a configuration of a raster image processing (RIP) processing unit illustrated in FIG. 3.

As illustrated in FIG. 4, the RIP processing unit 51Y includes a RIP controller 52Y and three drawing processing units 531Y to 533Y.

The RIP controller 52Y delivers processing request commands distributed thereto by the page-processing-request distribution unit 42, to the three drawing processing units 531Y to 533Y.

Each of the drawing processing units 531Y to 533Y is realized by software called a configurable PostScript interpreter (CPSI), and performs a drawing process on a print job written in PostScript so as to generate raster-format print data. Each of the drawing processing units 531Y to 533Y has a buffer memory capable of storing the generated print data for several pages. Additionally, each of the drawing processing units 531Y to 533Y stores, as a queue, the processing request commands delivered from the RIP controller 52Y in delivery order.

The printing mechanism section of the printing apparatus 1 which corresponds to the color yellow (Y) outputs an image on the basis of the image data resulting from the drawing processes performed by the multiple drawing processing units 531Y to 533Y.

The processing request commands are sent to the drawing processing units 531Y to 533Y by the RIP controller 52Y. Each of the drawing processing units 531Y to 533Y converts into image data the print job for a page specified by each of the processing request commands received from the RIP controller 52Y, thereby performing a drawing process and generating the print data.

FIG. 4 illustrates an example in which the RIP controller 52Y delivers processing request commands to the three drawing processing units 531Y to 533Y in rotation, but actually the RIP controller 52Y does not deliver the processing request commands just in rotation. Rather, the RIP controller 52Y delivers processing request commands to the corresponding drawing processing units 531Y to 533Y to which the processing request commands are deliverable in ascending order of page.

Here, to deliver processing request commands in ascending order of page equates to delivery of processing request commands so that a page specified by a processing request command to be delivered next time is a page following a page specified by a processing request command that was delivered last time. Specifically, when a processing request command specifying a drawing process of page 3 and then a processing request command specifying a drawing process of page 4 are delivered, these processing request commands are delivered in ascending order of page.

A reason why the RIP controller 52Y delivers processing request commands to the three drawing processing units 531Y to 533Y in ascending order of page will be described below.

As described above, PostScript is a non-page-independent PDL. Accordingly, contents of print resources, such as the font and form, set on a certain page are also effective on other pages.

For example, a case will be described where content of a print resource (OOO) is set to "A" on page 1, and the content is then changed to "B" on page 3 as illustrated in FIG. 5.

In the case illustrated in FIG. 5, when a drawing process is performed for page 4 using this print resource, the drawing process for page 4 is not performed successfully unless a command on page 3 is executed. Thus, the drawing process of the print job for page 4 requires execution of commands included in pages 1 to 3.

On the other hand, when the drawing process of the print job for page 2 is performed after the drawing process of the print job for page 4, the print resource (OOO) has already been changed to "B". For this reason, when the drawing process of the print job for page 2 is performed in this state, the successful drawing process is not performed.

Accordingly, when processing request commands are delivered in descending order of page such that a page specified by the current processing request command is a page preceding a page specified by the last processing request command, each of the drawing processing units 531Y to 533Y again performs processing of the sent print job from the first page.

Specifically, when a drawing process for page 4 is specified by a processing request command and then a drawing process for page 2 which is a page preceding this page is specified, any of the drawing processing units 531Y to 533Y again performs processing of the sent print job from page 1, i.e., the first page.

When the RIP controller 52Y delivers processing request commands to the drawing processing units 531Y to 533Y in descending order of page, the RIP controller 52Y actually reboots and controls the drawing processing units 531Y to 533Y so as to execute the print job again from the first page.

For such a reason, the RIP controller 52Y delivers processing request commands to the three drawing processing units 531Y to 533Y in ascending order of page.

When there is no drawing processing unit to which processing request commands are deliverable in ascending order of page among the drawing processing units 531Y to 533Y, the RIP controller 52Y may deliver a processing request command to a drawing processing unit in which a processed page has been proceeded most, which means that the page number of the page has been proceeded most.

Each of the drawing processing units 531Y to 533Y performs a drawing process for a page specified by a processing request command received from the RIP controller 52Y in the above manner. However, when the three drawing processing units 531Y to 533Y execute all of the commands from the first page to the specified page of the print job, no benefit is obtained from parallel processing performed by the three drawing processing units 531Y to 533Y.

Accordingly, each of the drawing processing units 531Y to 533Y performs a drawing process for a page specified by a processing request command received from the RIP controller 52Y, by using a page skip function of executing only a command that is in data of the print job for each page and that affects a print setting of a following page.

Here, a PDL includes control commands and drawing commands. The control commands are for changing print resources, such as specification of the font and form to be used, and for deciding divisions of pages. The drawing commands are for creating raster-format print data by using the print resources specified by the control commands.

Since the PDL has such a configuration, processes for executing a print job represented in a PDL are classified into interpreter processes for analyzing control commands, and rendering processes for executing drawing commands to perform drawing on the basis of an analysis result obtained from the interpreter processes.

Even if the rendering process on a specific page is omitted, this omission does not affect processes to be performed for the following pages. However, if a certain interpreter process is omitted, a necessary setting is not made on a print resource and, thus, this omission may affect processes to be performed for the following pages.

For this reason, when an intermediate page is specified, each of the drawing processing units 531Y to 533Y performs, for pages other than the specified page, part of the interpreter process which may affect processes to be performed for the following pages, and performs, for the specified page, both the interpreter process and the rendering process.

A function of executing part of the interpreter process for pages other than the specified page until the process reaches the specified page in this manner is referred to as a page skip function.

For example, when processing of page 3 (P3) is specified, the processing takes time if pages 1 to 3 are processed in a manner illustrated in FIG. 6A. Thus, each of the drawing processing units 531Y to 533Y partially performs the interpreter process for pages 1 and 2 (P1 and P2), and performs both the interpreter process and the rendering process for page 3 (P3), as illustrated in FIG. 6B.

Alternatively, the PS analysis unit 41 may acquire information on the number of pages of the entire print job by executing page division commands with a drawing processing unit, such as a CPSI. The page-processing-request distribution unit 42 may distribute processing request commands to the four image processing sections 32Y, 32M, 32C, and 32K on the basis of the acquired information.

Similarly, the RIP controller 52Y illustrated in FIG. 4 may deliver processing request commands to the three drawing processing units 531Y to 533Y by using the information on the number of pages of the entire print job which is acquired by executing page division commands with a drawing processing unit, such as a CPSI.

Such a processing mode in which only the information on the number of pages is acquired from a print job is called a page count mode. This page count mode will be described with reference to FIGS. 7A and 7B.

FIG. 7A illustrates a case where both the interpreter process and the rendering process are performed on all pages of a print job. However, it is sufficient enough to execute only page division commands among control commands, in order to acquire the information on the number of pages. Accordingly, in the page count mode, only page division commands are executed in the interpreter process as illustrated in FIG. 7B.

The use of this page count mode permits the information on the number of pages to be acquired with a time that is much shorter than a time taken when all commands of the print job are executed. Additionally, the use of this page count mode permits the number of pages to be counted with a processing load that is less than a processing load of the aforementioned page skip function.

Now, an operation of the RIP processing unit 51Y according to the exemplary embodiment will be described with reference to the drawings.

When pages specified in the print job sequentially increase as illustrated in FIGS. 3 and 4, the RIP controller 52Y sequentially assigns and delivers the processing request commands to the drawing processing units 531Y to 533Y, thereby being able to deliver the processing request commands to the drawing processing units 531Y to 533Y in ascending order of page.

For example, the RIP controller 52Y may deliver the processing request commands to the drawing processing units 531Y to 533Y in rotation, or may select one of the drawing processing units 531Y to 533Y having no processing request command to be processed and deliver the processing request command thereto.

However, when printing such as book printing is performed, pages to be output do not necessarily start from page 1. In book printing, pages are assigned so that the pages are arranged in the correct order after bookbinding. Thus, pages are specified inconsecutively, such as in the order of page 1, page 100, page 2, page 99, . . . , and printing is performed.

Figure 8A:
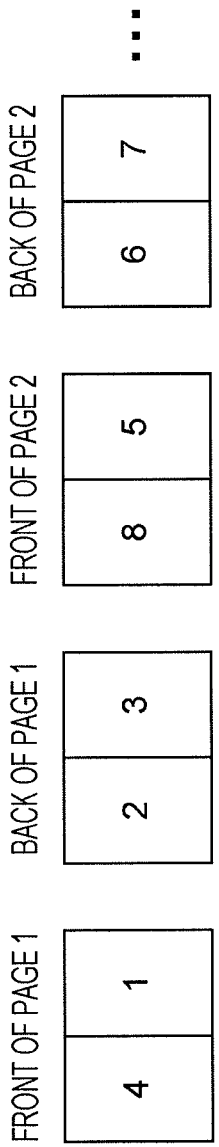
FIGS. 8A and 8B describe specific examples of an imposition process in book printing.
Figure 8B:
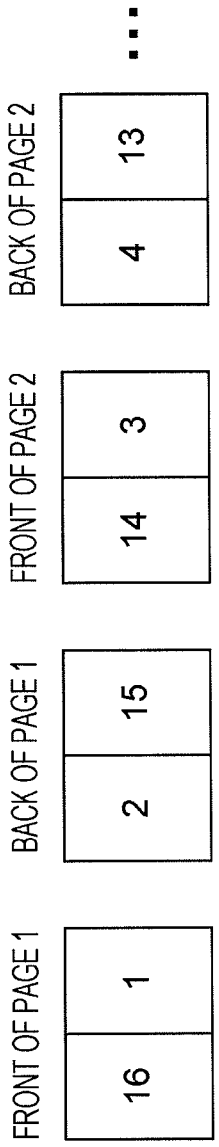
Figure 11:
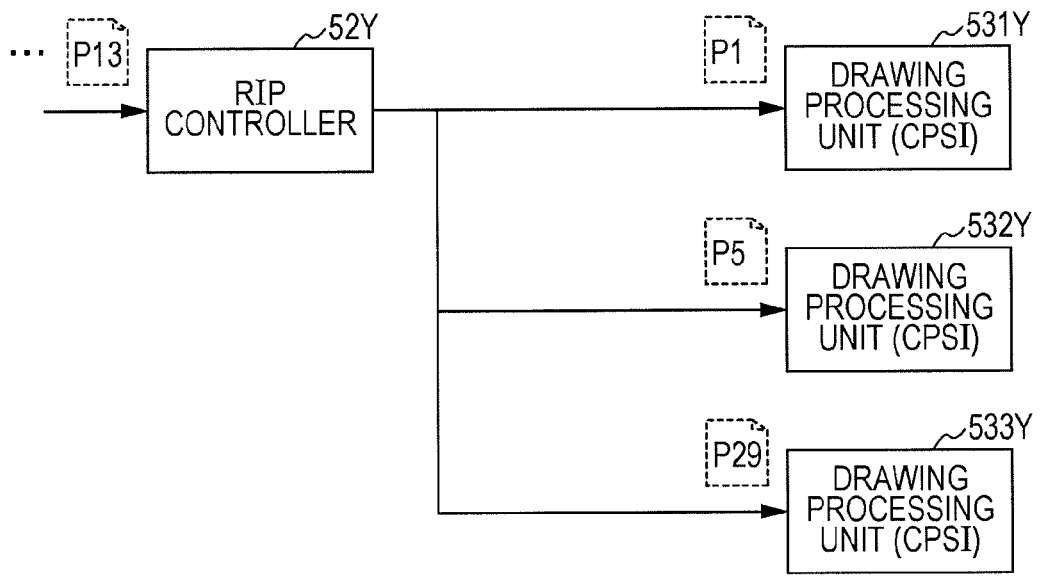
FIGS. 11 to 17 illustrate an operation of the RIP controller for delivering each processing request command when the print job illustrated in FIG. 9 is converted into print data.

For example, specific examples are illustrated in FIGS. 8A and 8B. FIG. 8A illustrates the order of pages to be output when four pages are imposed on each sheet. Also, FIG. 8B illustrates the order of pages to be output when 16 pages are saddle stitched.

FIG. 9 illustrates a state in which processing request commands each specifying a page to be processed are mechanically delivered to the drawing processing units 531Y to 533Y having no processing request command to be processed, when a print job is executed in which pages are arranged inconsecutively.

Referring to FIG. 9, since pages to be output are specified in the order of P1, P5, P29, P13, P17, . . . , pages are also specified inconsecutively in each of the drawing processing units 531Y to 533Y. For example, regarding the drawing processing unit 531Y, processing request commands are sent in the order of P1, P13, P9, . . . .

When performing the drawing process for page 9 (P9) after the drawing process for page 13 (P13), the drawing processing unit 531Y is rebooted and again performs the interpreter process on the print job from page 1 to page 8 because of the aforementioned reason.

Additionally, regarding the drawing processing unit 533Y, processing request commands are sent in descending order of page, i.e., page 29 (P29) and then page 21 (P21). Thus, the drawing processing unit 533Y is also rebooted and again performs the interpreter process on the print job from page 1 to page 20.

In such a case where pages specified in processing request commands distributed from the page-processing-request distribution unit 42 are inconsecutive and the specified pages subjected to the drawing process are not arranged in ascending order of page, the RIP controller 52Y according to the exemplary embodiment selects a drawing processing unit from among the drawing processing units 531Y to 533Y so that a page specified by the processing request command to be delivered next time is a page following a page specified by the processing request command that was delivered last time. The RIP controller 52Y then delivers the processing request command to the selected drawing processing unit.

When there is plural drawing processing units to which processing request commands are deliverable in ascending order of page, among the drawing processing units 531Y to 533Y, the RIP controller 52Y may deliver a processing request command to one of the plural drawing processing units in which the difference between the page specified by the last processing request command and the page specified by the processing request command to be delivered this time, which means the difference between the page number of the page specified by the last processing request command and the page number of the page specified by the processing request command to be delivered this time, is small.

Additionally, if any of the drawing processing units 531Y to 533Y has many processing request commands to be processed, the RIP controller 52Y may avoid delivering the processing request command thereto.

A flowchart of FIG. 10 illustrates a processing flow of an operation of the RIP controller 52Y for performing a delivery process on the basis of such conditions.

First, the RIP controller 52Y selects a processing request command to be delivered, from among processing request commands distributed by the page-processing-request distribution unit 42 (step S101).

The RIP controller 52Y then determines whether or not there is at least one drawing processing unit (CPSI) to which processing request commands are deliverable in ascending order of page, among the drawing processing units 531Y to 533Y (step S102).

Upon determining that there is at least one drawing processing unit to which processing request commands are deliverable in ascending order of page, among the drawing processing units 531Y to 533Y, the RIP controller 52Y selects, from among the at least one drawing processing unit, a drawing processing unit in which the difference between the page specified by the processing request command to be delivered and the page specified by the processing request command that was delivered last, which means that the difference between the page number of the page specified by the processing request command to be delivered and the page number of the page specified by the processing request command that was delivered last, is the smallest (step S103). Meanwhile, when there is only one drawing processing unit to which processing request commands are deliverable in ascending order of page, the RIP controller 52Y selects this drawing processing unit.

Upon determining that there is no drawing processing unit to which processing request commands are deliverable in ascending order of page among the drawing processing units 531Y to 533Y in step S102, the RIP controller 52Y selects a drawing processing unit in which a processed page has been proceeded most, which means that the page number of the page has been proceeded most (step S104). For example, suppose that processing request commands specifying drawing processes of page 20, page 12, and page 6 have already been delivered to the drawing processing units 531Y, 532Y, and 533Y, respectively. In this case, the RIP controller 52Y selects the drawing processing unit 531Y to which the processing request command specifying the drawing process of page 20 has been delivered, as the drawing processing unit in which the processed page has been proceeded most.

The RIP controller 52Y then delivers the processing request command to the drawing processing unit selected in step S103 or S104 (step S105).

If another processing request command to be processed still exists (YES in step S106), the RIP controller 52Y selects a processing request command to be delivered next, and then repeats the processing in steps S102 to S105.

With reference to FIGS. 11 to 17, a description will be given of an operation of the RIP controller 52Y for delivering processing request commands when the print job illustrated in FIG. 9 is converted into print data on the basis of the flowchart illustrated in FIG. 10.

First, when any processing request command has not yet been delivered to the drawing processing units 531Y to 533Y, the RIP controller 52Y delivers a processing request command specifying page 1 (P1) to the drawing processing unit 531Y, a processing request command specifying page 5 (P5) to the drawing processing unit 532Y, and a processing request command specifying page 29 (P29) to the drawing processing unit 533Y.

Figure 12:
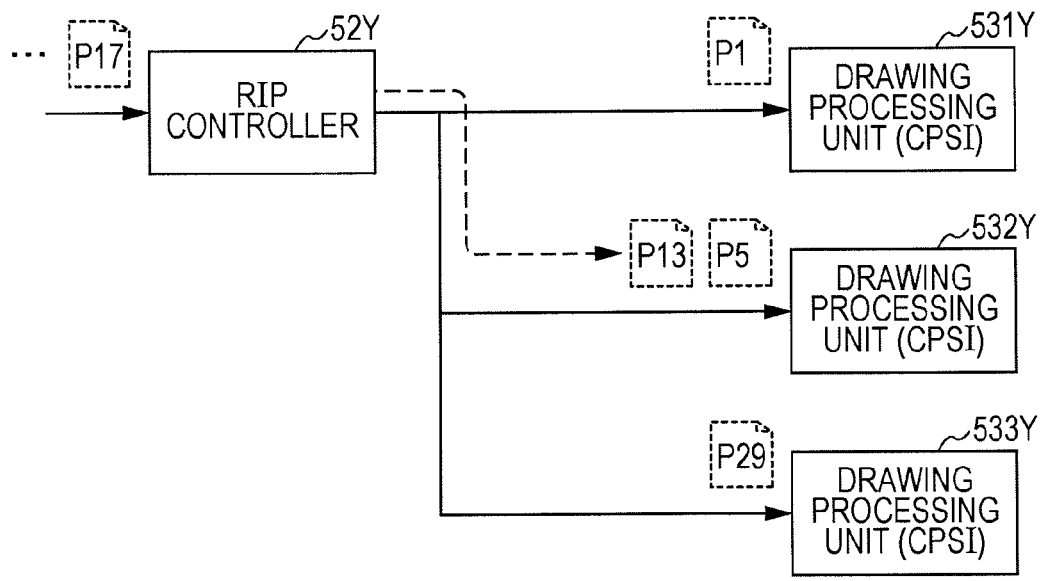

Regarding the next processing request command specifying page 13 (P13), as illustrated in FIG. 12, the RIP controller 52Y delivers the processing request command to the drawing processing unit 532Y in which the difference between the pages, which means the difference in page number, is small from among the drawing processing units 531Y and 532Y to which processing request commands are deliverable in ascending order of page, because the difference between P13 and P5 is 8, whereas the difference between P13 and P1 is 12.

Figure 13:
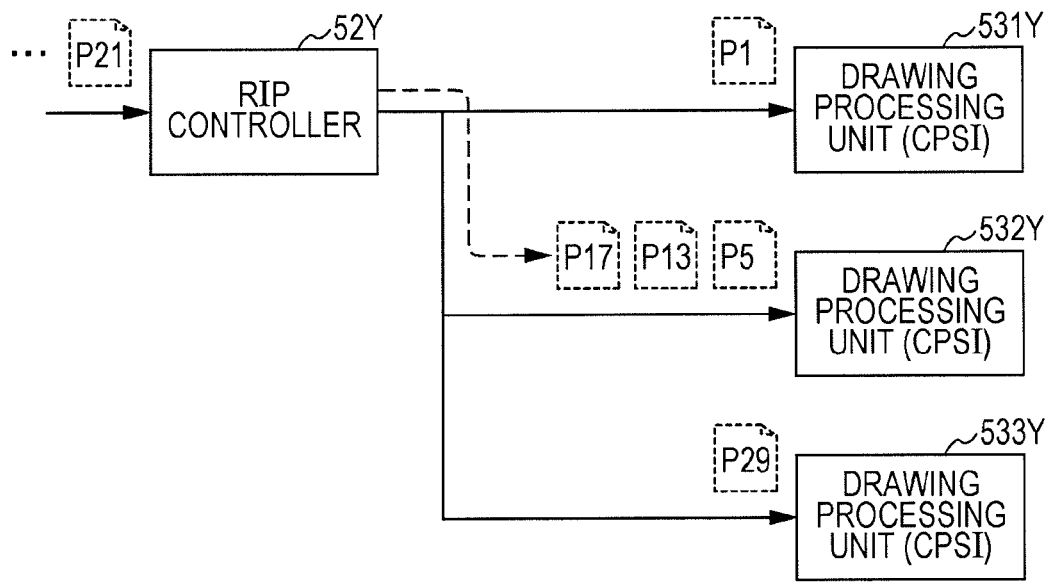
Figure 14:
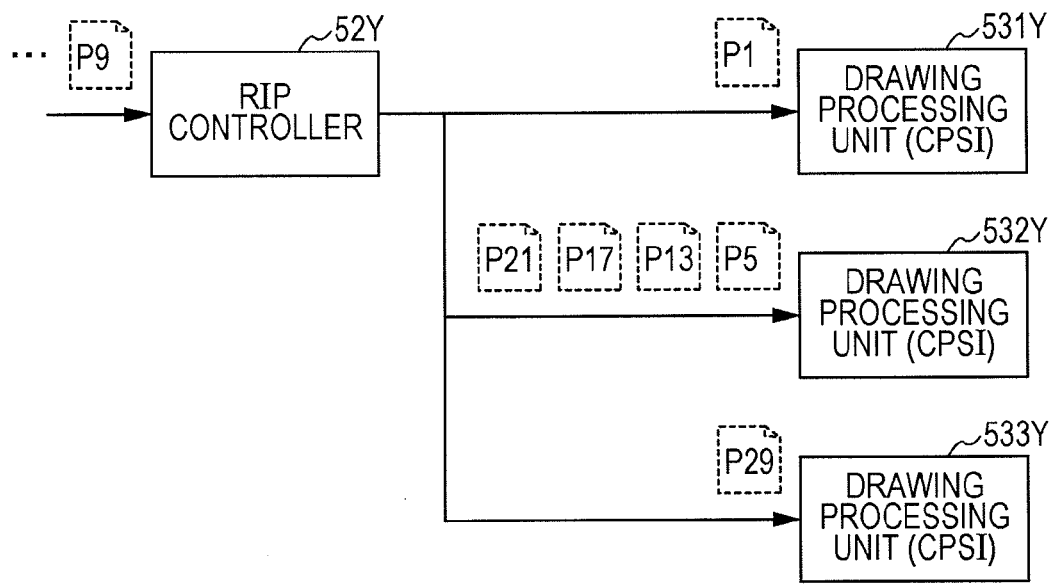

The RIP controller 52Y performs similar processing and delivers the next processing request command specifying page (P17) to the drawing processing unit 532Y as illustrated in FIG. 13. The RIP controller 52Y also delivers the next processing request command specifying page 21 (P21) to the drawing processing unit 532Y as illustrated in FIG. 14.

Figure 15:
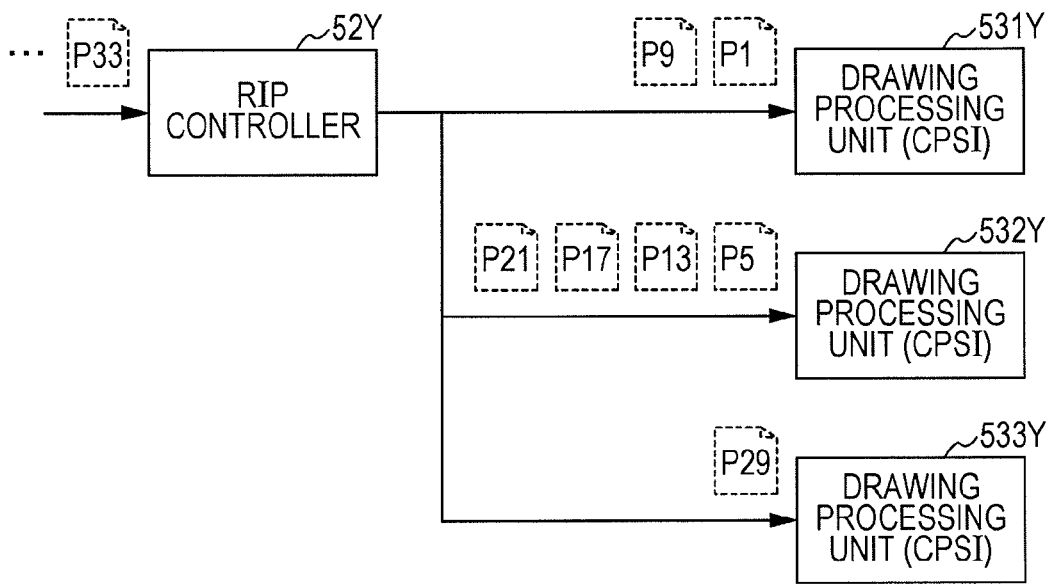

Furthermore, regarding the next processing request command specifying page 9 (P9), the RIP controller 52Y delivers the processing request command to the drawing processing unit 531Y as illustrated in FIG. 15 because the drawing processing unit 531Y is the only drawing processing unit to which processing request commands are deliverable in ascending order of page.

Figure 16:
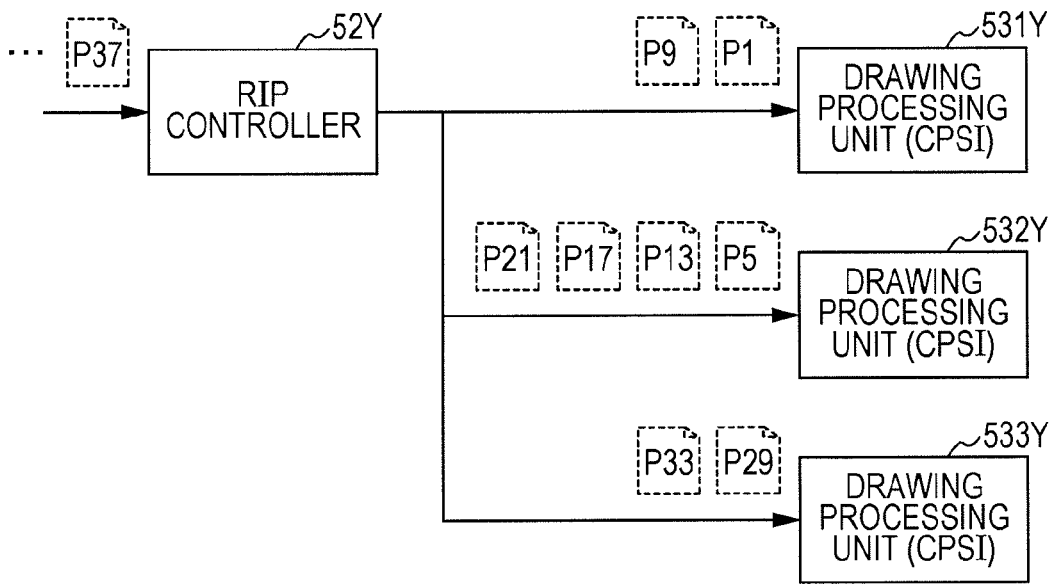

Regarding the next processing request command specifying page 33 (P33), the RIP controller 52Y delivers the processing request command to the drawing processing unit 533Y in which the difference between the pages, which means the difference in page number, is small as illustrated in FIG. 16 because processing request commands are deliverable in ascending order of page to all the drawing processing units 531Y to 533Y.

Figure 17:
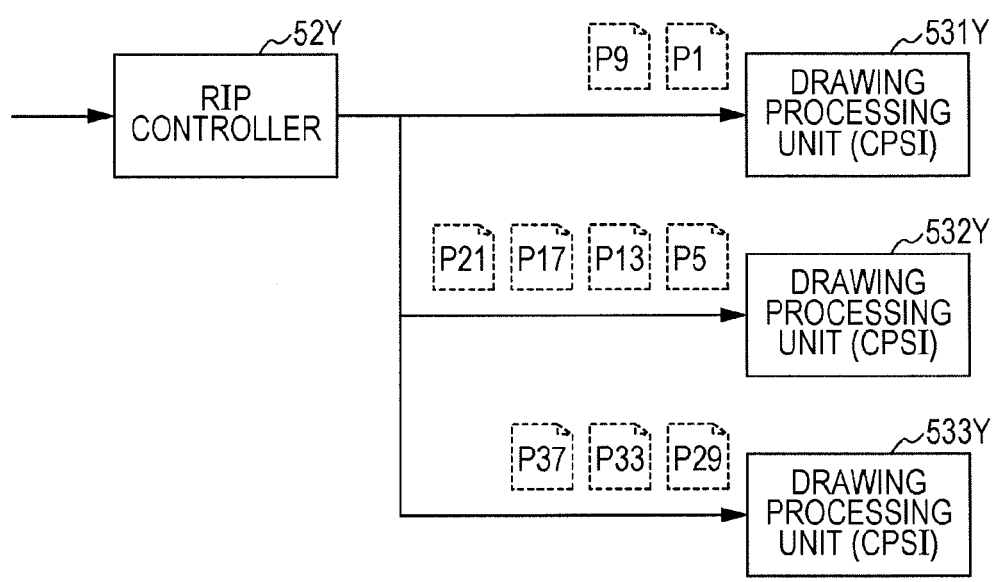

Similarly, regarding the next processing request command specifying page 37 (P37), the RIP controller 52Y delivers the processing request command to the drawing processing unit 533Y in which the difference between the pages, which means the difference in page number, is small as illustrated in FIG. 17.

FIGS. 11 to 17 illustrate that the processing request commands delivered to the drawing processing units 531Y to 533Y are accumulated. However, the drawing process is performed in the drawing processing units 531Y to 533Y in parallel to delivery of the processing request commands, and the executed processing request commands are deleted from the queue. Thus, the processing request commands are not accumulated in the processing-wait queue as illustrated in FIGS. 11 to 17.

Modifications

In the above exemplary embodiment, the print-job sending unit 43 sends the entire print job to the image processing sections 32Y, 32M, 32C, and 32K. However, the exemplary embodiment of the present invention is not limited to such a configuration. The exemplary embodiment of the present invention is also applicable to a case where a print job constituted by multiple pages is stored in a memory and the print-job sending unit 43 sends reference data (corresponding to reference information) for accessing the print job stored in this memory to the image processing sections 32Y, 32M, 32C, and 32K instead of sending the entire print job.

In such a configuration, in the RIP processing unit 51Y, the RIP controller 52Y delivers processing request commands to the drawing processing units 531Y to 533Y along with the reference data. Each of the drawing processing units 531Y to 533Y accesses the print job stored in the memory on the basis of the reference data received from the RIP controller 52Y, and converts the print job for a page specified by the received processing request command, thereby performing a drawing process.

In the above exemplary embodiment, a case has been described where a print job written in PostScript, namely, a non-page-independent PDL, is executed. However, the exemplary embodiment of the present invention is not limited to this particular example, and is similarly applicable to a case of executing a print job written in PDF, namely, a page-independent PDL in which a change regarding a print setting made on a certain page is not applied to other pages. In this case, the print-job distribution processing section 31 may include a conversion unit that converts PDF data into PostScript data. The print-job sending unit 43 may send the PostScript data generated by this conversion unit to the image processing sections 32Y, 32M, 32C, and 32K.

With such a configuration, parallel processing is performed by multiple drawing processing units on a page-by-page basis even when a drawing process is performed on PDF data by using hitherto used CPSIs, instead of using a drawing method in which the drawing process is performed directly on PDF data without converting the PDF data into PostScript data.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control device, comprising:
    at least one hardware processor configured to implement:
        a plurality of drawing processing units configured to perform a drawing process on a print instruction written in a page description language;
        a sending unit configured to send the entirety of a print instruction constituted by a plurality of pages, to the plurality of drawing processing units; and
        a delivery unit configured to sequentially deliver processing requests to the plurality of drawing processing units, the processing requests each specifying which page in the print instruction is to be subjected to a drawing process and each being delivered from the delivery unit to the plurality of drawing processing units in any of ascending and descending order of page numbers of the plurality of pages,
    wherein each of the plurality of drawing processing units is further configured to perform a drawing process by converting the print instruction for a page specified by a processing request delivered by the delivery unit into image data, and again to perform, in response to processing requests being delivered in descending page number order such that a page number specified by a current processing request is a page number preceding a page specified by a last processing request, processing of the sent print instruction from the first page, and
    wherein the delivery unit is further configured to deliver a processing request to a drawing processing unit to which processing requests are deliverable in ascending page number order such that a page number specified by the processing request that is to be delivered next time is a page number following a page specified by a processing request that was delivered last time and such that a difference between the page number of a page that is to be delivered next time and the page number of the page specified by the processing request that was delivered last time to the drawing processing unit is less than a difference between the page number of the page that is to be delivered next time and another page number of another page most recently delivered to another one of the plurality of drawing processing units.

2. The print control device according to claim 1, wherein the delivery unit is further configured, in response to there being no drawing processing unit to which processing requests are deliverable in ascending page number order, to deliver a processing request to a drawing processing unit in which a processed page has been proceeded most.

3. The print control device according to claim 1, wherein the plurality of drawing processing units are further configured to perform a drawing process for pages specified by processing requests delivered by the delivery unit, by using a page skip function of executing only a command that is in data of the print instruction for each page and that affects a print setting of a following page.

4. The print control device according to claim 1, wherein the delivery unit is further configured to deliver processing requests to the plurality of drawing processing units by using information on the number of pages of the entirety of the print instruction, the information being obtained by executing only a command regarding page division by using the drawing processing unit.

5. The print control device according to claim 1, wherein the at least one hardware processor is further configured to implement:
    a conversion unit configured to convert a print instruction written in a page-independent page description language into a print instruction written in a non-page-independent page description language,
    wherein the sending unit is further configured to send the entirety of the print instruction resulting from the conversion by the conversion unit, to the plurality of drawing processing units.

6. The print control device according to claim 1, wherein the delivery unit is further configured to deliver the page having the page number specified by the processing request that is to be delivered next time according to a determination that the difference, between the page number of the page that is to be delivered next time and the page number of the page specified by the processing request that was delivered last time to the drawing processing unit, is less than any of a plurality of differences between page numbers of the page that is to be delivered next time and respective other page numbers of other pages most recently delivered to other ones of the plurality of drawing processing units,
    the other page numbers comprising the another page number,
    the other pages comprising the another page, and
    the other ones of the plurality of drawing processing units comprising the another one of the plurality of drawing processing units.

7. The print control device according to claim 1, wherein the another page most recently delivered to the another one of the plurality of drawing processing units is one of the pages of the print instruction.

8. A print control device, comprising:
at least one hardware processor configured to implement:
a plurality of drawing processing units configured to perform a drawing process on a print instruction written in a page description language;
a sending unit configured to send the entirety of a print instruction constituted by a plurality of pages, to the plurality of drawing processing units; and
a delivery unit configured to sequentially deliver processing requests to the plurality of drawing processing units, the processing requests each specifying which page in the print instruction is to be subjected to a drawing process and each being delivered from the delivery unit to the plurality of drawing processing units in any of ascending and descending order of page numbers of the plurality of pages,
wherein each of the plurality of drawing processing units is further configured to perform a drawing process by converting the print instruction for a page specified by a processing request delivered by the delivery unit into image data, and
wherein the delivery unit is further configured to deliver a processing request to a drawing processing unit to which processing requests are deliverable in ascending order of page such that a page specified by the processing request that is to be delivered next time is a page following a page specified by a processing request that was delivered last time, and
wherein the delivery unit is further configured, in response to there being a plurality of drawing processing units to which processing requests are deliverable in ascending order of page, to deliver a processing request to a drawing processing unit such that a difference between a page number of the page that is to be delivered next time and a page number of the page specified by a processing request that was delivered last time to the drawing processing unit is less than a difference between the page number of the page that is to be delivered next time and another page number of another page most recently delivered to another one of the plurality of drawing processing units.

9. A print control device, comprising:
at least one hardware processor configured to implement:
a plurality of drawing processing units configured to perform a drawing process on a print instruction written in a page description language;
a sending unit configured to send the entirety of a print instruction constituted by a plurality of pages, to the plurality of drawing processing units; and
a delivery unit configured to sequentially deliver processing requests to the plurality of drawing processing units, the processing requests each specifying which page in the print instruction is to be subjected to a drawing process and each being delivered from the delivery unit to the plurality of drawing processing units in any of ascending and descending order of page numbers of the plurality of pages,
wherein each of the plurality of drawing processing units is further configured to perform a drawing process by converting the print instruction for a page specified by a processing request delivered by the delivery unit into image data, and
wherein the delivery unit is further configured to deliver a processing request to a drawing processing unit to which processing requests are deliverable in ascending page number order such that a page number specified by the processing request that is to be delivered next time is a page number following a page specified by a processing request that was delivered last time and such that a difference between the page number of a page that is to be delivered next time and the page number of the page specified by the processing request that was delivered last time to the drawing processing unit is less than a difference between the page number of the page that is to be delivered next time and another page number of another page most recently delivered to another one of the plurality of drawing processing units, and
wherein the delivery unit is further configured, in response to there being no drawing processing unit to which processing requests are deliverable in ascending page number order, to deliver a processing request to a drawing processing unit in which a processed page has been proceeded most.

10. A print control device, comprising:
at least one hardware processor configured to implement:
a plurality of drawing processing units configured to perform a drawing process on a print instruction written in a page description language;
a memory configured to store the entirety of a print instruction constituted by a plurality of pages; and
a delivery unit configured to sequentially deliver processing requests and reference information for accessing the print instruction stored in the memory to the plurality of drawing processing units, the processing requests each specifying which page in the print instruction is to be subjected to a drawing process and each being delivered from the delivery unit to the plurality of drawing processing units in any of ascending and descending order of page numbers of the plurality of pages,
wherein each of the plurality of drawing processing units is further configured to perform a drawing process by accessing the print instruction stored in the memory on the basis of the reference information delivered by the delivery unit and converting the print instruction for a page specified by a processing request delivered by the delivery unit into image data, and again to perform, in response to processing requests being delivered in descending page number order such that a page number specified by a current processing request is a page number preceding a page specified by a last processing request, processing of the sent print instruction from the first page, and
wherein the delivery unit is further configured to deliver a processing request to a drawing processing unit to which processing requests are deliverable in ascending page number order such that a page number specified by the processing request that is to be delivered next time is a page number following a page specified by a processing request that was delivered last time and such that a difference between the page number of a page that is to be delivered next time and the page number of the page specified by the processing request that was delivered last time to the drawing processing unit is less than a difference between the page number of the page that is to be delivered next time and another page number of another page most recently delivered to another one of the plurality of drawing processing units.

11. The print control device according to claim 10, wherein the delivery unit is further configured, in response to there being no drawing processing unit to which processing requests are deliverable in ascending page number order, to deliver a processing request to a drawing processing unit in which a processed page has been proceeded most.

12. A print control device, comprising:
at least one hardware processor configured to implement:
a plurality of drawing processing units configured to perform a drawing process on a print instruction written in a page description language;
a memory configured to store the entirety of a print instruction constituted by a plurality of pages; and
a delivery unit configured to sequentially deliver processing requests and reference information for accessing the print instruction stored in the memory to the plurality of drawing processing units, the processing requests each specifying which page in the print instruction is to be subjected to a drawing process and each being delivered from the delivery unit to the plurality of drawing processing units in any of ascending and descending order of page numbers of the plurality of pages,
wherein each of the plurality of drawing processing units is further configured to perform a drawing process by accessing the print instruction stored in the memory on the basis of the reference information delivered by the delivery unit and converting the print instruction for a page specified by a processing request delivered by the delivery unit into image data, and
wherein the delivery unit is further configured to deliver a processing request to a drawing processing unit to which processing requests are deliverable in ascending order of page such that a page specified by the processing request that is to be delivered next time is a page following a page specified by a processing request that was delivered last time, and
the delivery unit is further configured, in response to there being a plurality of drawing processing units to which processing requests are deliverable in ascending order of page, to deliver a processing request to a drawing processing unit such that a difference between the page number of a page that is to be delivered next time and the page number of the page specified by the processing request that was delivered last time to the drawing processing unit is less than a difference between the page number of the page that is to be delivered next time and another page number of another page most recently delivered to another one of the plurality of drawing processing units.

13. A print control device, comprising:
at least one hardware processor configured to implement:
a plurality of drawing processing units configured to perform a drawing process on a print instruction written in a page description language;
a memory configured to store the entirety of a print instruction constituted by a plurality of pages; and
a delivery unit configured to sequentially deliver processing requests and reference information for accessing the print instruction stored in the memory to the plurality of drawing processing units, the processing requests each specifying which page in the print instruction is to be subjected to a drawing process and each being delivered from the delivery unit to the plurality of drawing processing units in any of ascending and descending order of page numbers of the plurality of pages,
wherein each of the plurality of drawing processing units is further configured to perform a drawing process by accessing the print instruction stored in the memory on the basis of the reference information delivered by the delivery unit and converting the print instruction for a page specified by a processing request delivered by the delivery unit into image data, and
wherein the delivery unit is further configured to deliver a processing request to a drawing processing unit to which processing requests are deliverable in ascending page number order such that a page number specified by the processing request that is to be delivered next time is a page number following a page specified by a processing request that was delivered last time, and
wherein the delivery unit is further configured, in response to there being no drawing processing unit to which processing requests are deliverable in ascending page number order, to deliver a processing request to a drawing processing unit in which a processed page has been proceeded most and such that a difference between the page number of a page that is to be delivered next time and the page number of the page specified by the processing request that was delivered last time to the drawing processing unit is less than a difference between the page number of the page that is to be delivered next time and another page number of another page most recently delivered to another one of the plurality of drawing processing units.

14. A non-transitory computer readable medium storing a program causing a computer to execute a process, the process comprising:
sending the entirety of a print instruction constituted by a plurality of pages, to a plurality of drawing processing units configured to perform a drawing process on a print instruction written in a page description language;
delivering, in response to sequentially delivering processing requests each specifying which page in the print instruction is to be subjected to a drawing process to the plurality of drawing processing units and each being delivered from a delivery unit to the plurality of drawing processing units in any of ascending and descending order of page numbers of the plurality of pages, a processing request to a drawing processing unit to which processing requests are deliverable in ascending page number order such that a page number specified by the processing request that is to be delivered next time is a page number following a page specified by a processing request that was delivered last time; and
performing, in the plurality of drawing processing units, a drawing process by converting the print instruction for a page specified by a delivered processing request into image data, and again performing, in response to processing requests being delivered in descending page number order such that a page number specified by a current processing request is a page number preceding a page specified by a last processing request, processing of the sent print instruction from the first page and such that a difference between the page number of a page that is to be delivered next time and the page number of the page specified by the processing request that was delivered last time to the drawing processing unit is less than a difference between the page number of the page that is to be delivered next time and another page number of another page most recently delivered to another one of the plurality of drawing processing units.

15. A non-transitory computer readable medium storing a program causing a computer to execute a process, the process comprising:
sending the entirety of a print instruction constituted by a plurality of pages, to a plurality of drawing processing units configured to perform a drawing process on a print instruction written in a page description language;

delivering, in response to sequentially delivering processing requests each specifying which page in the print instruction is to be subjected to a drawing process to the plurality of drawing processing units and each being delivered from a delivery unit to the plurality of drawing processing units in any of ascending and descending order of page numbers of the plurality of pages, a processing request to a drawing processing unit to which processing requests are deliverable in ascending order of page such that a page specified by the processing request that is to be delivered next time is a page following a page specified by a processing request that was delivered last time, and delivering, in response to there being a plurality of drawing processing units to which processing requests are deliverable in ascending order of page, a processing request to a drawing processing unit in which a difference between the page specified by the last processing request and the page specified by the processing request to be delivered this time is small; and performing, in the plurality of drawing processing units, a drawing process by converting the print instruction for a page specified by a delivered processing request into image data.

16. A non-transitory computer readable medium storing a program causing a computer to execute a process, the process comprising:

sending the entirety of a print instruction constituted by a plurality of pages, to a plurality of drawing processing units configured to perform a drawing process on a print instruction written in a page description language;

delivering, in response to sequentially delivering processing requests each specifying which page in the print instruction is to be subjected to a drawing process to the plurality of drawing processing units and each being delivered from the delivery unit to the plurality of drawing processing units in any of ascending and descending order of page numbers of the plurality of pages, a processing request to a drawing processing unit to which processing requests are deliverable in ascending page number order such that a page number specified by the processing request that is to be delivered next time is a page number following a page specified by a processing request that was delivered last time and such that a difference between the page number of a page that is to be delivered next time and the page number of the page specified by the processing request that was delivered last time to the drawing processing unit is less than a difference between the page number of the page that is to be delivered next time and another page number of another page most recently delivered to another one of the plurality of drawing processing units, and delivering, in response to there being no drawing processing unit to which processing requests are deliverable in ascending page number order, a processing request to a drawing processing unit in which a processed page has been proceeded most; and performing, in the plurality of drawing processing units, a drawing process by converting the print instruction for a page specified by a delivered processing request into image data.

17. A non-transitory computer readable medium storing a program causing a computer to execute a process, the process comprising:

storing the entirety of a print instruction constituted by a plurality of pages;

delivering reference information for accessing the stored print instruction, to a plurality of drawing processing units configured to perform a drawing process on a print instruction written in a page description language;

delivering, in response to sequentially delivering processing requests each specifying which page in the print instruction is to be subjected to a drawing process to the plurality of drawing processing units and each being delivered from the delivery unit to the plurality of drawing processing units in any of ascending and descending order of page numbers of the plurality of pages, a processing request to a drawing processing unit to which processing requests are deliverable in ascending page number order such that a page number specified by the processing request that is to be delivered next time is a page number following a page specified by a processing request that was delivered last time and such that a difference between the page number of a page that is to be delivered next time and the page number of the page specified by the processing request that was delivered last time to the drawing processing unit is less than a difference between the page number of the page that is to be delivered next time and another page number of another page most recently delivered to another one of the plurality of drawing processing units; and performing, in the plurality of drawing processing units, a drawing process by accessing the stored print instruction on the basis of the delivered reference information and converting the print instruction for a page specified by a delivered processing request into image data, and again performing, in response to processing requests being delivered in descending page number order such that a page number specified by a current processing request is a page number preceding a page specified by a last processing request, processing of the sent print instruction from the first page.

18. A non-transitory computer readable medium storing a program causing a computer to execute a process, the process comprising:

storing the entirety of a print instruction constituted by a plurality of pages;

delivering reference information for accessing the stored print instruction, to a plurality of drawing processing units configured to perform a drawing process on a print instruction written in a page description language;

delivering, in response to sequentially delivering processing requests each specifying which page in the print instruction is to be subjected to a drawing process to the plurality of drawing processing units and each being delivered from the delivery unit to the plurality of drawing processing units in any of ascending and descending order of page numbers of the plurality of pages, a processing request to a drawing processing unit to which processing requests are deliverable in ascending order of page such that a page specified by the processing request that is to be delivered next time is a page following a page specified by a processing request that was delivered last time, and delivering, in response to there being a plurality of drawing processing units to which processing requests are deliverable in ascending order of page, a processing request such that a difference between the page number of a page that is to be delivered next time and the page number of the page specified by the processing request that was delivered last time to the drawing processing unit is less than a difference between the page number of the page that is to be delivered next time and another page number of another page most recently delivered to another one of the plurality of drawing processing units; and performing, in the plurality of drawing processing units, a drawing process by accessing the stored print instruction on the basis of the delivered reference information and converting the print instruction for a page specified by a delivered processing request into image data.

19. A non-transitory computer readable medium storing a program causing a computer to execute a process, the process comprising:

storing the entirety of a print instruction constituted by a plurality of pages;

delivering reference information for accessing the stored print instruction, to a plurality of drawing processing units configured to perform a drawing process on a print instruction written in a page description language;

delivering, in response to sequentially delivering processing requests each specifying which page in the print instruction is to be subjected to a drawing process to the plurality of drawing processing units and each being delivered from the delivery unit to the plurality of drawing processing units in any of ascending and descending order of page numbers of the plurality of pages, a processing request to a drawing processing unit to which processing requests are deliverable in ascending page number order such that a page number specified by the processing request that is to be delivered next time is a page number following a page specified by a processing request that was delivered last time and such that a difference between the page number of a page that is to be delivered next time and the page number of the page specified by the processing request that was delivered last time to the drawing processing unit is less than a difference between the page number of the page that is to be delivered next time and another page number of another page most recently delivered to another one of the plurality of drawing processing units, and delivering, in response to there being no drawing processing unit to which processing requests are deliverable in ascending page number order, a processing request to a drawing processing unit in which a processed page has been proceeded most; and performing, in the plurality of drawing processing units, a drawing process by accessing the stored print instruction on the basis of the delivered reference information and converting the print instruction for a page specified by a delivered processing request into image data.

* * * * *